US012628986B2

(12) United States Patent
Marinov

(10) Patent No.: US 12,628,986 B2
(45) Date of Patent: May 19, 2026

(54) COOKING SPLASH GUARD

(71) Applicant: Dimitar Marinov, Atlanta, GA (US)

(72) Inventor: Dimitar Marinov, Atlanta, GA (US)

( * ) Notice: Subject to any disclaimer, the term of this patent is extended or adjusted under 35 U.S.C. 154(b) by 475 days.

(21) Appl. No.: 18/386,088

(22) Filed: Nov. 1, 2023

(65) Prior Publication Data

US 2025/0134310 A1 May 1, 2025

(51) Int. Cl.
*A47J 37/10* (2006.01)
*A47J 36/38* (2006.01)

(52) U.S. Cl.
CPC ............. *A47J 37/108* (2013.01); *A47J 36/38* (2013.01)

(58) Field of Classification Search
CPC ................................. A47J 37/108; A47J 36/38
See application file for complete search history.

(56) References Cited

U.S. PATENT DOCUMENTS 5,351,673 A * 10/1994 Somerton ............... F24C 15/12
126/299 C 2004/0173201 A1 * 9/2004 Haemerle ............... F24C 15/12
126/299 C
2020/0124292 A1 * 4/2020 Haemerle ............... F24C 15/12

FOREIGN PATENT DOCUMENTS

| CN | 200998807 | * | 1/2008 |
| JP | 3252525 | * | 8/2025 |
| KR | 1358400 | * | 2/2014 |

* cited by examiner

*Primary Examiner* — Alfred Basichas
(74) *Attorney, Agent, or Firm* — H. Brock Kolls

(57) ABSTRACT

The present invention relates to a cooking splash guard that includes more than one hinge, a back panel, more than one partition panel, and more than one side panel. Hinges attach the partition panels to the back panel allowing the partition panels to be repositioned to stand vertically on a cooktop surface. Panel magnet fasteners are affixed along the perimeter of the partition panels. The edge of each side panel is magnetically coupled to the panel magnet fasteners, in a removable manner. Each of the side panels is repositionable along a side panel arc and vertically adjustable to avoid objects on the cooktop surface. A roof panel is hinged to the back panel and held in position by way of a tether that is attached to the exterior surface of the roof panel and the back panel.

20 Claims, 10 Drawing Sheets

104/106/108

310

126

132

316

316

144

110/112/114

132

110/112/114

144

132

104/106/108

132

126

110/112/114

134

136

136

102/104/106/108

314

116

102/104/106/108

134

116

136

COOKING SPLASH GUARD

TECHNICAL FIELD OF THE INVENTION

This invention relates to a cooking splash guard that includes more than one hinge, a back panel, more than one partition panel, and more than one side panel. Hinges attach the partition panels to the back panel allowing the partition panel to be repositioned to stand vertically on a cooktop surface. Panel magnet fasteners are affixed along the perimeter of the partition panels. The edge of each side panel is magnetically coupled to the panel magnet fasteners, in a removable manner. Each of the side panels is repositionable along a side panel arc and vertically to avoid objects on the cooktop surface.

BACKGROUND OF THE INVENTION

Before our invention splash, steam, and grease from cooking could easily coat broad areas of cooktop surfaces as well as walls adjacent to the cooktop surface. A shortcoming of many kitchen arrangements is that while it is desirable to provide a large cooktop surface and decorated backsplash walls and adjoining cabinetry it is difficult to contain the inevitable mess that cooking can become which can damage cooktop surfaces, backsplashes, cabinetry, and other surroundings.

Another shortcoming of modern cooktop surfaces can be that there can be many varying-height objects on or next to the cooktop surface such as burners, control panels, knobs, and other objects which can make it difficult to implement and level vertical barriers on the cooktop surface.

The present invention addresses these and other shortcomings by providing a cooking splash guard and other advantages. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a cooking splash guard which comprises more than one hinge, a back panel, and more than one partition panel. At least one of the hinges attaches between each of the partition panels and the back panel allowing the partition panels to be repositioned along a partition panel arc, engendering the cooking splash guard to stand vertically on a cooktop surface.

The cooking splash guard further comprises more than one panel magnet fastener that is affixed along the perimeter of the partition panel, and more than one side panel. The edge of each of the side panels is magnetically coupled to the panel magnet fastener, in a removable manner. Each of the side panels is repositionable along a side panel arc.

Additional shortcomings of the prior art are overcome and additional advantages are provided through the provision of a cooking splash guard that comprises more than one vent slot, more than one hinge, a back panel that has at least one of the vent slots, and more than one partition panel that has at least one of the vent slot. At least one of the hinges can be attached between each of the partition panels and the back panel allowing the partition panels to be repositioned along a partition panel arc, engendering the cooking splash guard to stand vertically on a cooktop surface.

The cooking splash shield further comprises more than one panel magnet fastener that is affixed along the perimeter edge of the partition panel. More than one side panel has at least one of the vent slots. The edge of each of the side panels is magnetically coupled to the panel magnet fastener, in a removable manner. Each of the side panels can be repositioned along a side panel arc.

The cooking splash shield further comprises a roof panel that has at least one of the vent slots. At least one hinge can be attached between the roof panel and the back panel. And, a tether traverses a portion of the exterior surface of the roof panel and the back panel. The tether fastens at one end to the roof panel and at the other end to the back panel supporting the roof panel in a mostly perpendicular position with respect to the back panel.

Additional shortcomings of the prior art are overcome and additional advantages are provided through the provision of a cooking splash guard which comprises more than one vent slot, more than one hinge, a back panel that has at least one of the vent slots, and more than one partition panel that has at least one of the vent slot. At least one of the hinges is attached between each of the partition panels and the back panel allowing the partition panels to be repositioned along a partition panel arc, engendering the cooking splash guard to stand vertically on a cooktop surface.

The cooking splash shield further comprises more than one panel magnet fastener that is affixed along the perimeter of the partition panel, and more than one side panel that has at least one of the vent slots. The edge of each of the side panels is magnetically coupled to the panel magnet fastener, in a removable manner. Each of the side panels is repositionable along a side panel arc and slidably adjustable vertically to accommodate different height objects on the cooktop surface.

The cooking splash shield further comprises a roof panel that has at least one of the vent slots. At least one of the hinges is attached between the roof panel and the back panel. And, a tether traverses a portion of the exterior surface of the roof panel and the back panel. The tether fastens at one end to the roof panel and at the other end to the back panel. The tether comprises an adjustment link. The adjustment link sets the tether length which allows the angle of the the roof panel to be adjusted with respect to the back panel.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
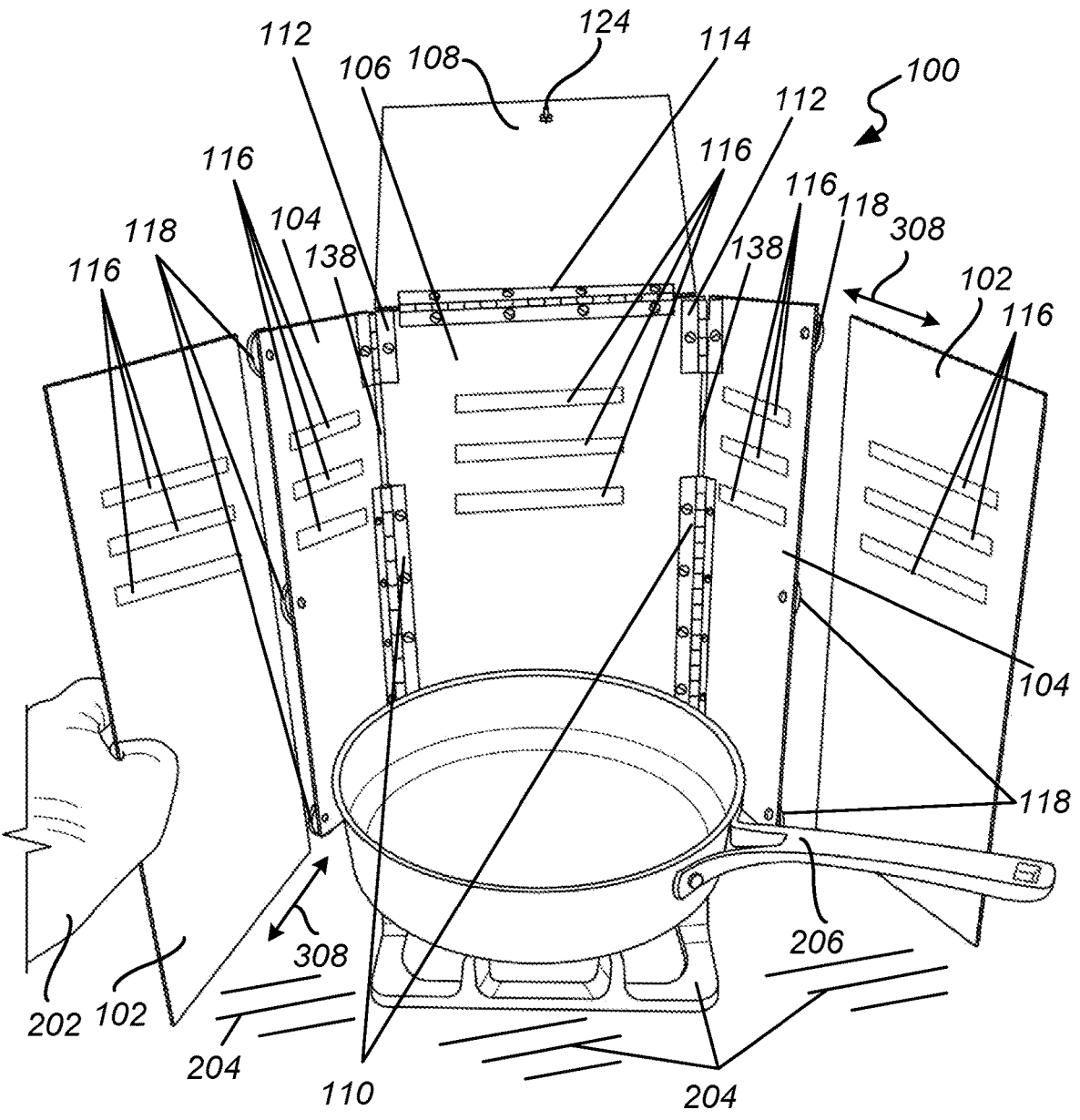
FIG. 1 illustrates one example of a cooking splash shield.

Turning now to the drawings in greater detail, it will be seen that in FIG. 1 there is illustrated one example of a cooking splash shield 100. In an exemplary embodiment, the cooking splash guard 100 can comprise more than one hinge 110/112. Such hinges can be of different lengths. In this regard, a longer hinge 110 can be positioned lower on the back panel 106 and partition panels 104 even down to the bottom perimeter edge, and extend upward past the pan 206 region (as illustrated in at least FIG. 1) to better contain splashes from egressing in between the back panel 106 and partition panels 104. A shorter hinge 112 can be used at the top edge perimeter leaving a short vertical vent gap 138 between the upper hinge 112 and the lower hinge 100 through which steam and other vapors can egress from the cooktop surface 204 area.

In an exemplary embodiment, cooking splash guard 100 can comprise a back panel 106. In some embodiments, the back panel 106 can be solid, in other embodiments the back panel 106 can have one or more vent slots 116 cut therethrough. In operation, the vent slots 116 allow steam and other vapors to egress from the cooktop surface 204 area. In embodiments where a fan 134 is used, the fan 134 can be magnetically mounted over one or more vent slots 116, and the airflow from fan 134 can be directed through one or more of the vent slots 116 away from or towards the cooktop surface 204 area depending on user 202 preferences. In this regard, user 202 can select where to magnetically mount the fan, which vent slots 116 to cover on which panels 102/104/106, or 108, and determine how airflow from the fan 134 should be directed.

Figure 10:
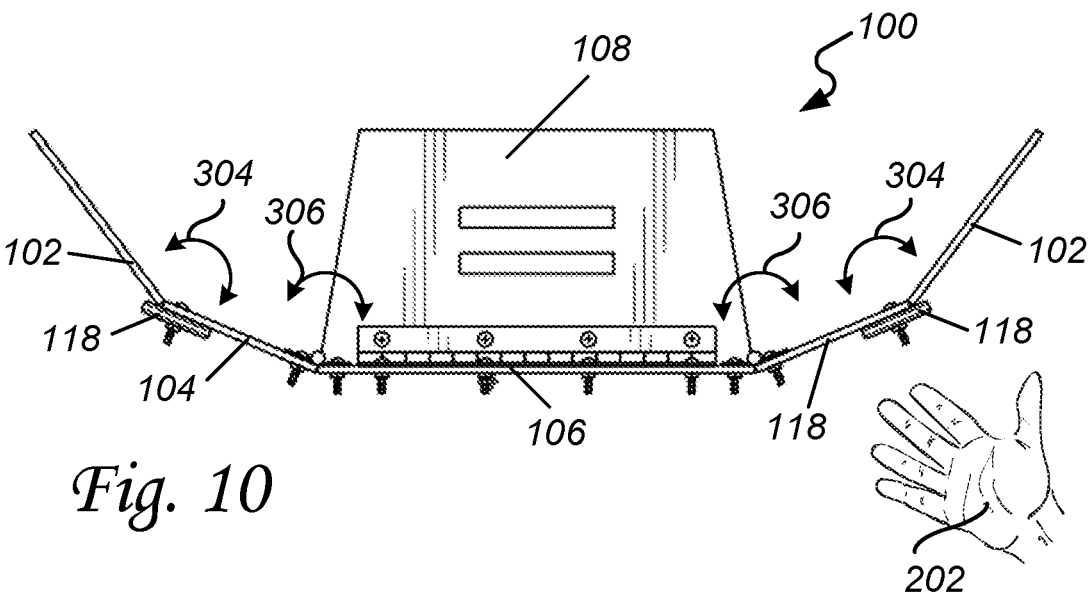
FIG. 10 illustrates one example of a bottom view of a cooking splash shield.

In an exemplary embodiment and better illustrated in at least FIGS. 1 and 10, the cooking splash guard 100 can comprise more than one partition panel 104. At least one hinge 110/112 can be attached between each of the partition panels 104 and the back panel 106 allowing the partition panels 104 to be repositioned along a partition panel arc 306 engendering the cooking splash guard to stand vertically on a cooktop surface 204. In this regard, user 202 can reposition the partition panels 104 to conveniently fit around the cooktop surface 204 elements such as stove eyelets, burners, control panels or knobs, and/or other elements.

Figure 6:
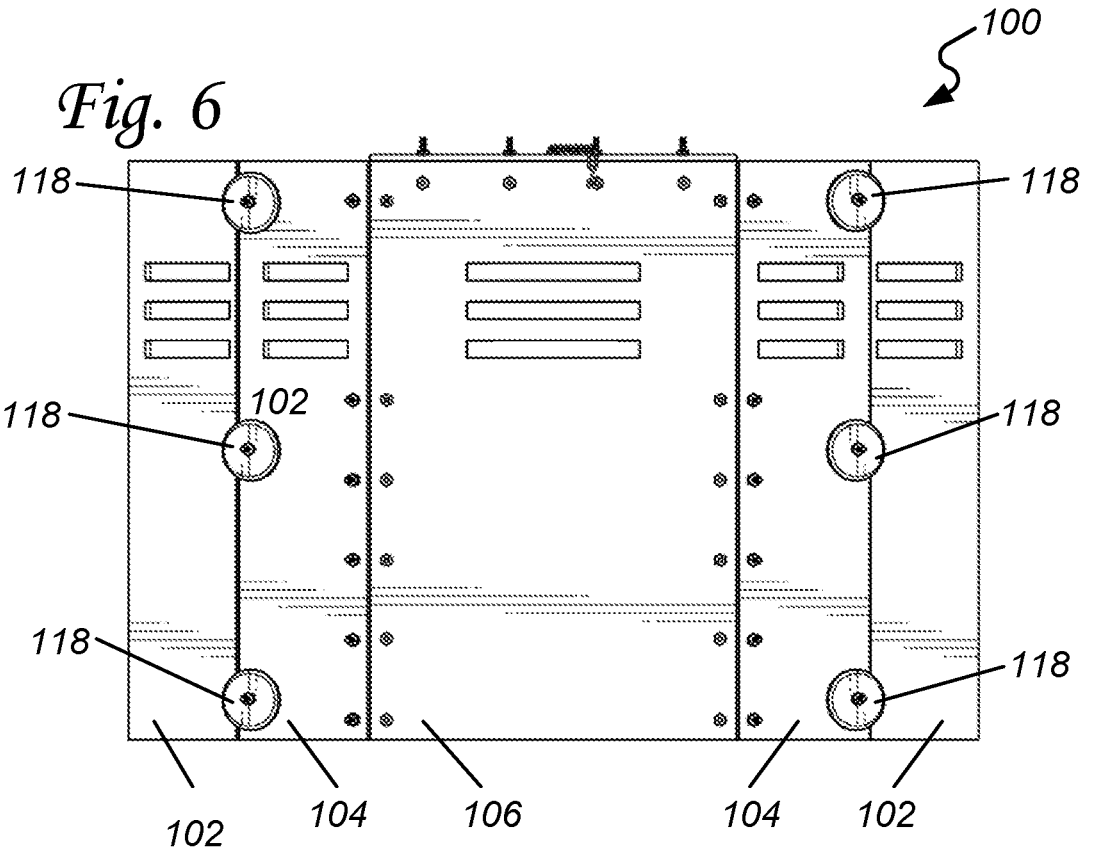
FIG. 6 illustrates one example of a back view of a cooking splash shield.

In an exemplary embodiment and better illustrated in at least FIGS. 1 and 6, the cooking splash guard 100 can comprise more than one panel magnet fastener 118 that can be affixed along the perimeter of partition panel 104. In operation, the panel magnet fasteners can themselves be fastened, in a permanent manner, by a fastener 120 to the partition panels 104. The panel magnet fasteners 118 can be affixed to the partition panel 104 in a manner that a portion of the magnet is exposed allowing the side panels 102, in a removable manner 308, to be magnetically aligned to partition panel 104 and coupled to the panel magnet fasteners 118.

In an exemplary embodiment, once coupled, as better illustrated in at least FIG. 10 the side panel can be repositioned along a side panel arc 304. In this regard, the cooking splash guard 100 can comprise more than one side panel 102 and the edge of each of the side panels 102 can be magnetically coupled to the panel magnet fastener 118, in a removable manner 308. Each of the side panels 102 can be repositioned along a side panel arc 304 so that the cooking splash guard 100 fits the cooktop surface 204.

In an exemplary embodiment, a roof panel 108 can be attached to the back panel 106 by way of at least one hinge attaches one end to the roof panel to the back panel, the hinge 114. In this regard, the hinge 114 adjustably supports the roof panel 108 in a mostly perpendicular position with respect to the back panel 106.

The roof panel 108 can be trapezoid in shape so that it can be easily folded inward onto the back panel 106, without binding on hinges 110/112 and other panels 102/104 for storing the cooking splash guard 100.

Figure 3:
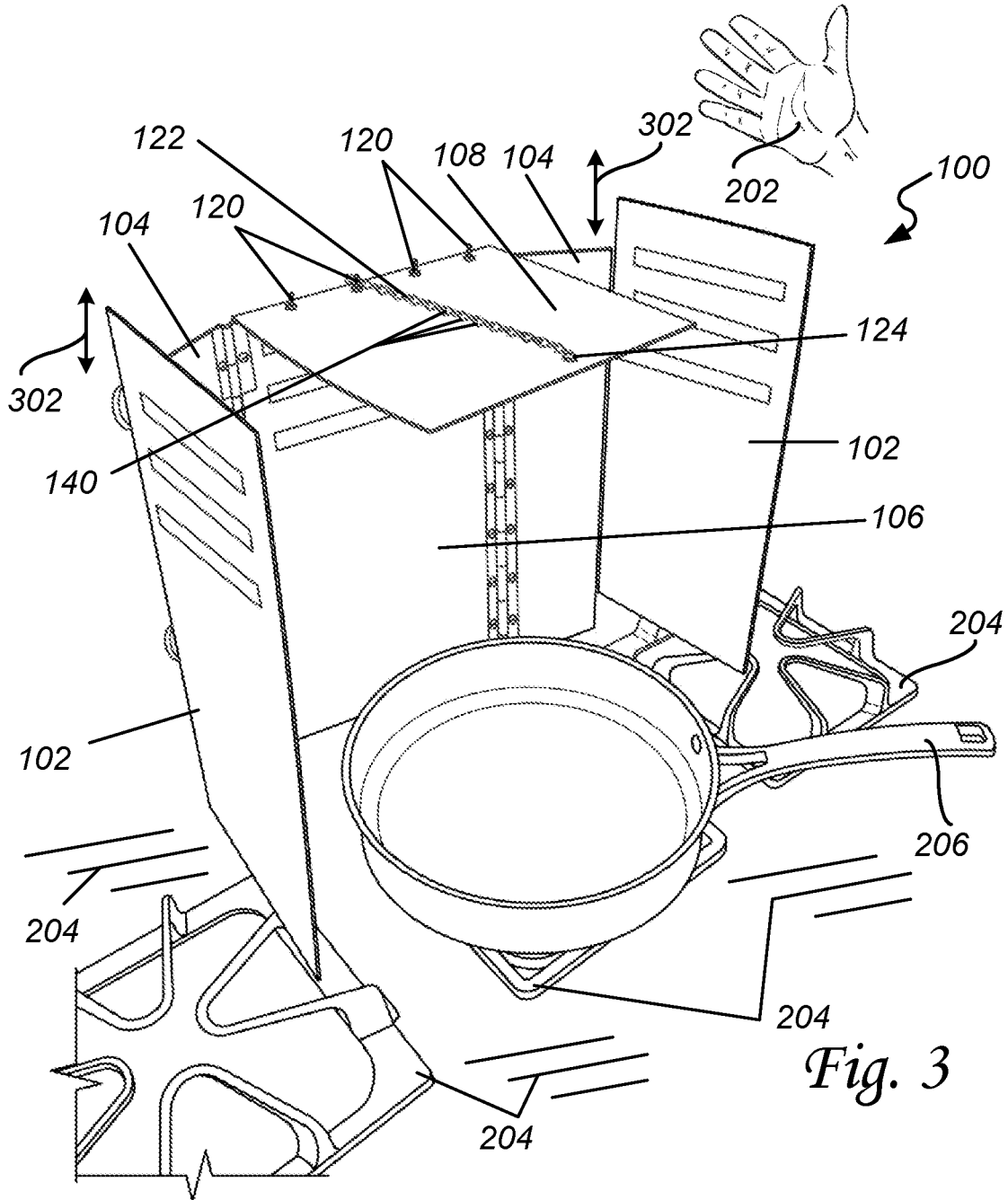
FIG. 3 illustrates one example of a cooking splash shield with the magnetically coupled side panels adjustably elevated.

As better illustrated in at least FIG. 3, a tether 122 can traverse a portion of the exterior surface of the roof panel 108 and the back panel 106. The tether 122 can be fastened at one end to the roof panel 108 and at the other end to the back panel 106 to support the roof panel 108 in a mostly perpendicular position with respect to the back panel 106.

The cooking splash guard 100 panels 102/104/106/108 and the hinges 110/112/114 can be fabricated from stainless steel, or other suitable materials, as may be required and/or desired in a particular embodiment.

The tether 122 can be fabricated from chain, wire rope, or other suitable material, as may be required and or desired in a particular embodiment.

In embodiments where tether 122 is a chain or at least a portion of tether 122 is a chain. Tether 122 can comprise more than one adjustment link 140. The adjustment link 140 sets tether 122 length which allows the angle of roof panel 108 to be adjusted with respect to back panel 106. In this regard, less tether 122 length elevates the front edge of roof panel 108 with respect to back panel 106, and more tether 122 length lowers the front edge of roof panel 108 with respect to back panel 106.

In an exemplary embodiment, fastener 120 can be a nut and bolt, a rivet, or other types and kinds of fasteners. In embodiments where fastener 120 is a nut and bolt, the nut can be a wing nut or other type of easy-to-screw-on/off removable fastener that enables user 202 to easily assemble and disassemble the cooking splash shield 100. In this regard, an advantage, in the present invention, is that the cooking splash shield 100 can easily be assembled and disassembled by user 202. As such, panels can be changed, and the entire cooking splash guard 100 assembled for use and then disassembled for storage if and as user 202 desires.

Figure 2:
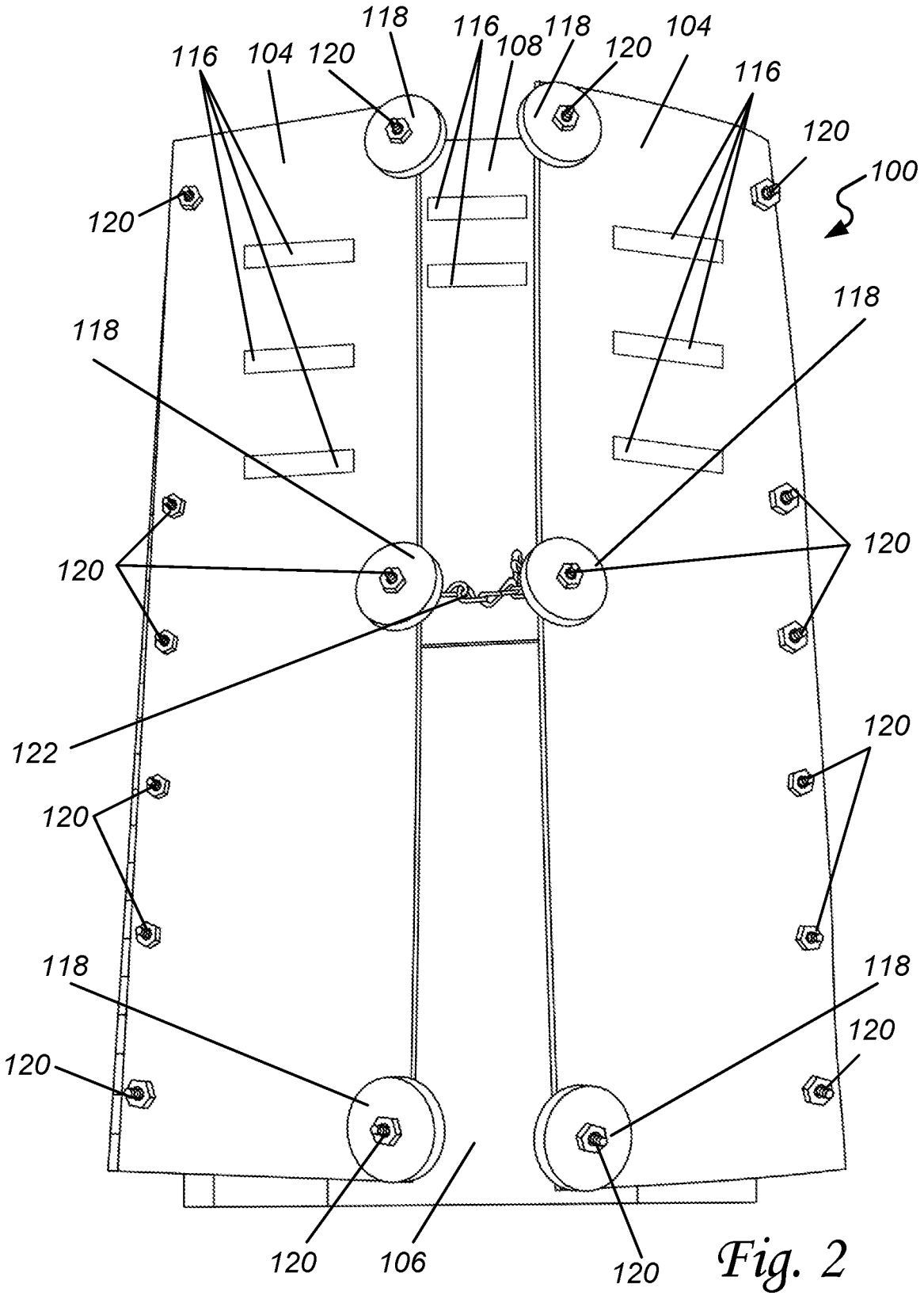
FIG. 2 illustrates one example of a cooking splash shield folded for storage.

As an alternative, referring to FIG. 2, there is illustrated one example of a cooking splash shield 100 folded for storage. In an exemplary embodiment, instead of disassembling the cooking splash guard 100 for storage, the cooking splash guard 100 can be folded and stored. In operation, the side panels 102 are removed 308 from the panel magnet fasteners 118, tether 122 is loosened and the roof panel 108 is folded inward flat on the back panel 106, and the partition panels 104 are then folded inward over the roof panel 108 onto the back panel 106. The loose tether 122, if chain or other metal can be magnetically coupled to the panel magnet fasteners 118 to hold it from motion and keep the partition panels 104 closed.

Referring to FIG. 3, there is illustrated one example of a cooking splash shield 100 with the magnetically coupled side panels 102 adjustably elevated 302. In an exemplary embodiment, when there is an object on the cooktop surface such as knobs, controls, burners, or other objects, one or both of the side panels 102 can be up and down vertically adjusted 302. In this regard, the side panels 102 can be magnetically coupled to the panel magnet fasteners 118 at varied elevations while the partition panels 104 and back panel when configured with a suitable partition panel arc 306 angle provide a stable level platform to support the cooking splash shield 100 from tipping over.

In operation, in an exemplary embodiment, each of the side panels 102 is slidably adjustable 302 up and down vertically to accommodate different height objects, such as knobs, controls, burners, or other objects, on the cooktop surface 204.

In an exemplary embodiment, a cooking splash guard 100 can comprise more than one vent slot 116, more than one hinge 110/112/114, a back panel 106 that has at least one of the vent slot 116, and more than one partition panel 104 that have at least one of the vent slot 116. At least one of the hinges 110/112 can be attached between each of the partition panels 104 and the back panel 106 allowing the partition panels to be repositioned along a partition panel arc 306 as better illustrated in at least FIG. 10, engendering the cooking splash guard 100 to stand vertically on a cooktop surface 204.

The cooking splash shield 100 further comprises more than one panel magnet fastener 118 that can be affixed along the perimeter of the partition panel 104, and more than one side panel 102 that have at least one of the vent slot 116. The edge of each of the side panels 102 are magnetically coupled to the panel magnet fastener 118, in a removable manner. Each of the side panels 102 can be repositioned along a side panel arc 304 and slidably 302 adjustable vertically as better illustrated in at least FIGS. 3 and 10 to accommodate different height objects on the cooktop surface. Such objects can include burners, knobs, control panels, and other objects.

The cooking splash shield 100 further comprises a roof panel 108 that has at least one of the vent slot 116. At least one of the hinges 114 can be attached between the roof panel 108 and the back panel 106. And, a tether 122 traverses a portion of the exterior surface of the roof panel 108 and the back panel 106. As better illustrated in at least FIG. 9, the tether 122 fastens at one end 124 to the roof panel and at the other end 146 to the back panel 106. As better illustrated in at least FIG. 3, the tether 122 can comprise at least one of an adjustment link 140. The adjustment link 140 sets the tether 122 length which allows the angle of the the roof panel 108 to be adjusted with respect to the back panel 106.

Figure 4:
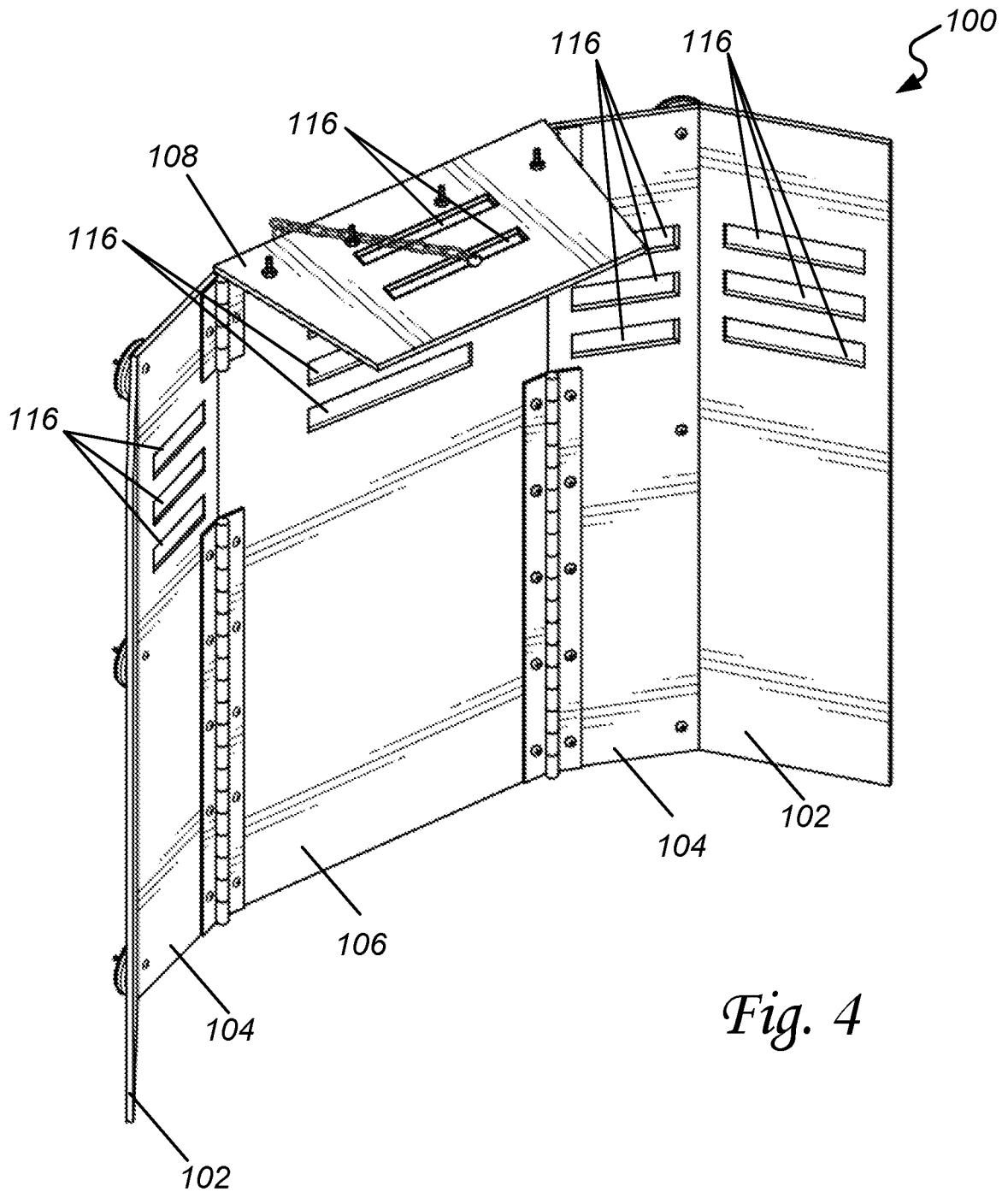
FIG. 4 illustrates one example of a perspective view of a cooking splash shield.

Referring to FIG. 4, there is illustrated one example of a perspective view of a cooking splash shield 100. In an exemplary embodiment, at least one of the following can have at least one vent slot 116: the back panel 106, the roof panel 108, the partition panels 104, or the side panels 102. In addition, at least the side panel 102 can be inverted so that vent slot 116 can be positioned at the bottom portion of the side panel 102 instead of the top portion.

Figure 5:
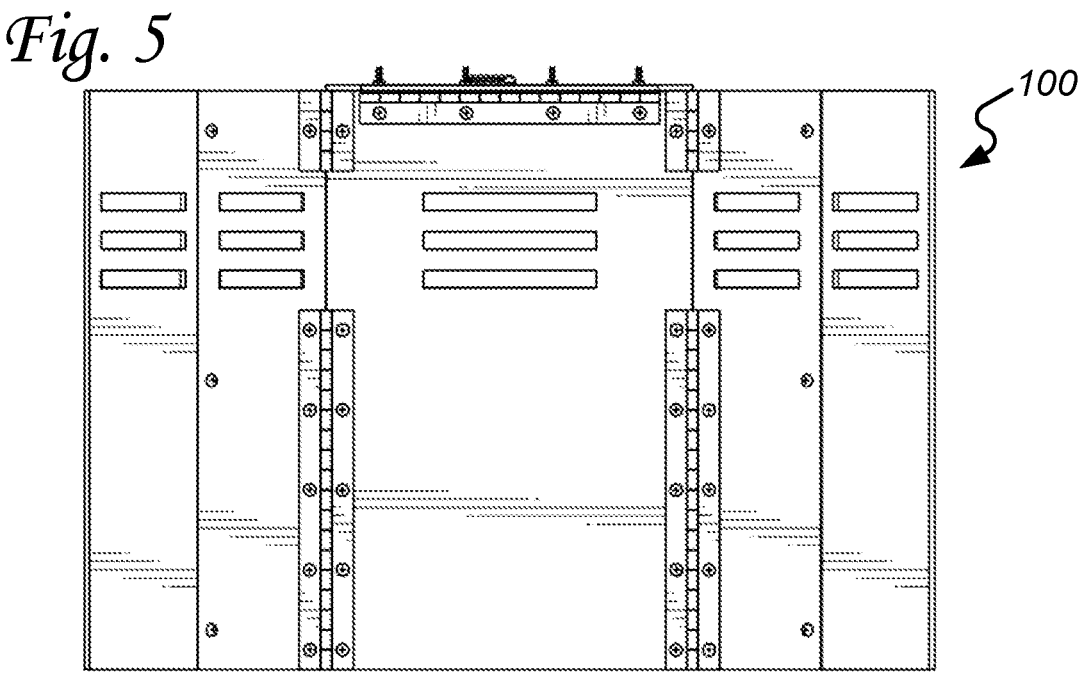
FIG. 5 illustrates one example of a front view of a cooking splash shield.
Figures 7, 8:
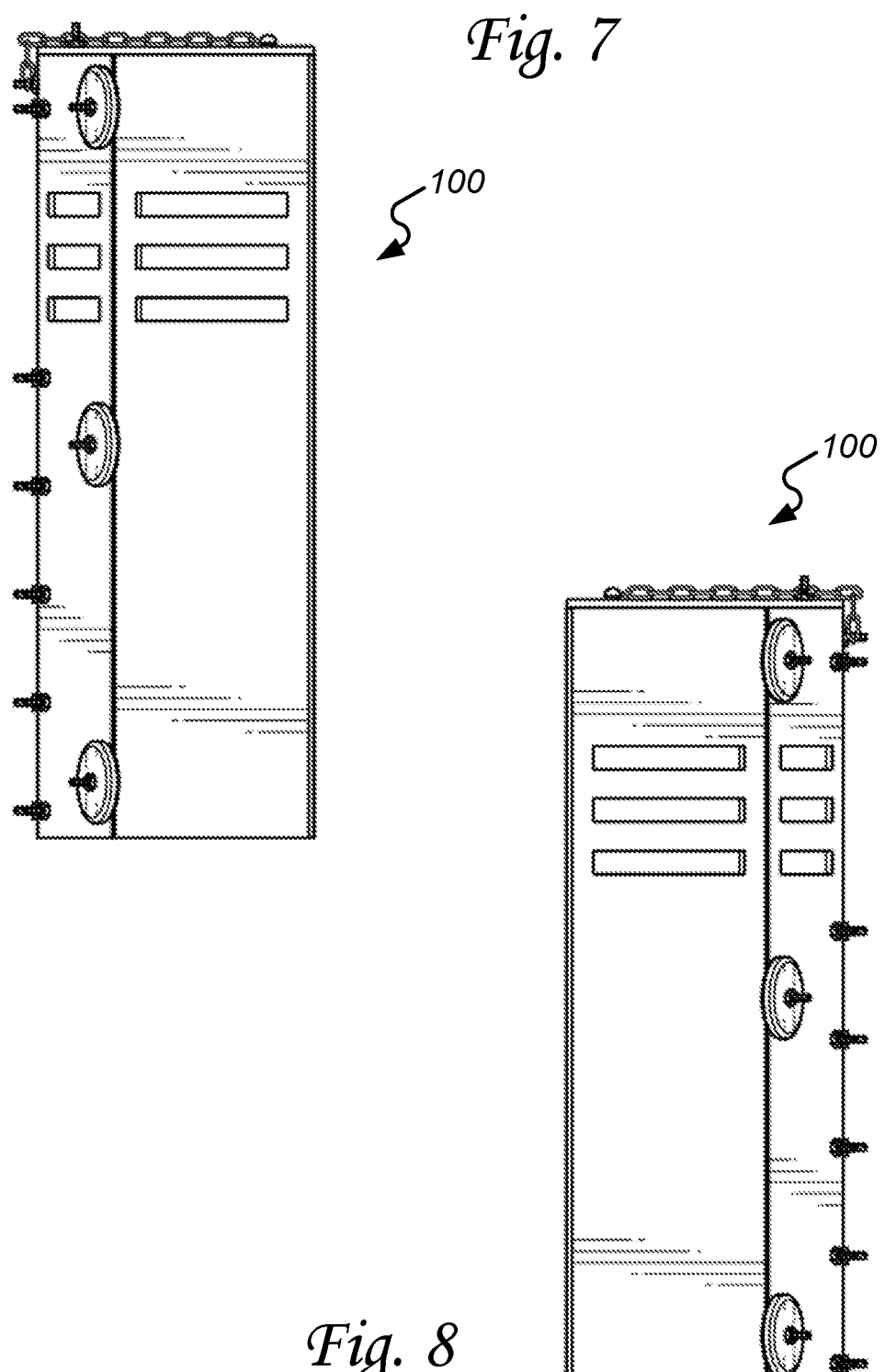
FIG. 7 illustrates one example of a left side view of a cooking splash shield.
FIG. 8 illustrates one example of a right side view of a cooking splash shield.
Figure 9:
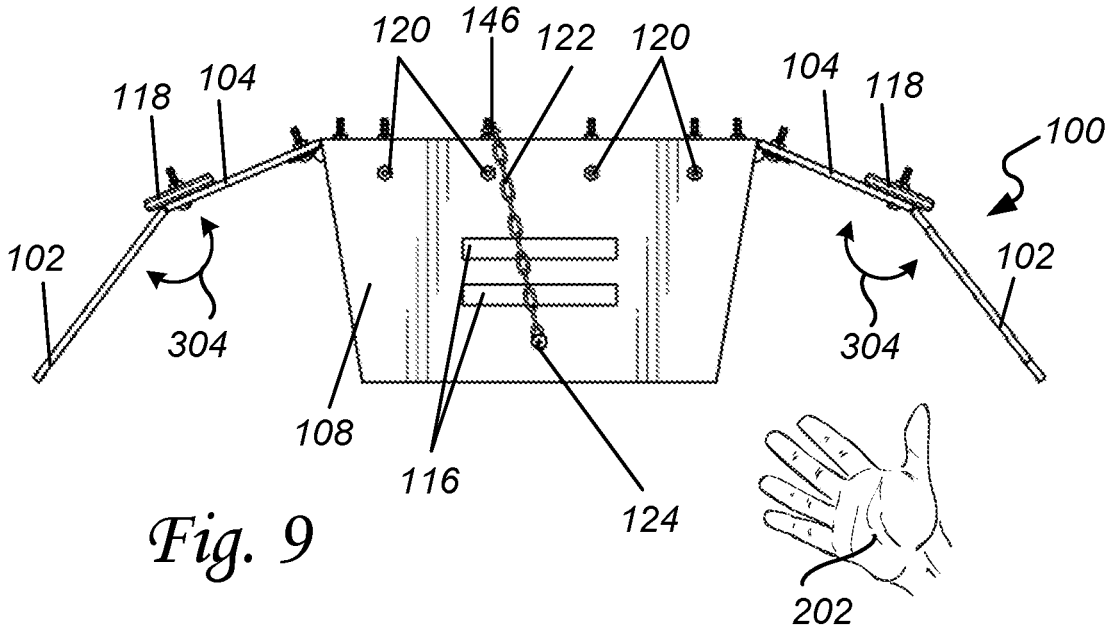
FIG. 9 illustrates one example of a top view of a cooking splash shield.

Referring to FIG. 5, there is illustrated one example of a front view of a cooking splash shield 100. Referring to FIG. 6, there is illustrated one example of a back view of a cooking splash shield 100. Referring to FIG. 7, there is illustrated one example of a left side view of a cooking splash shield 100. Referring to FIG. 8, there is illustrates one example of a right side view of a cooking splash shield 100. Referring to FIG. 9, there is illustrated one example of a top view of a cooking splash shield 100. Referring to FIG. 10, there is illustrated one example of a bottom view of a cooking splash shield 100.

In an exemplary embodiment, a cooking splash guard 100 can comprise more than one vent slot 116, more than one hinge 110/112/114, a back panel 106 that has at least one of the vent slot 116, and more than one partition panel 104 that has at least one of the vent slot 116. At least one of the hinges 110/112/114 can be attached between each of the partition panels 104 and the back panel 106 allowing the partition panels 104 to be repositioned along a partition panel arc 306 which is better illustrated in at least FIG. 10, engendering the cooking splash guard 100 to stand vertically on a cooktop surface 204 area.

The cooking splash shield 100 further comprises more than one panel magnet fastener 118 that is affixed along the perimeter edge of the partition panel 104. More than one side panel 102 has at least one of the vent slot 116, edge of each of the side panel 102 are magnetically coupled to the panel magnet fastener 118, in a removable manner. Each of the side panels 102 can be repositioned along a side panel arc 304.

The cooking splash shield 100 further comprises a roof panel 108 that has at least one of the vent slot 116. At least one hinge 114 can be attached between the roof panel 108 and the back panel 106. And, a tether 122 traverses a portion of the exterior surface of the roof panel 108 and the back panel 106. As better illustrated in at least FIG. 9, the tether 122 fastens 124 at one end to the roof panel 108 and at the other end 146 to the back panel 106 supporting the roof panel 108 in a mostly perpendicular position with respect to the back panel 106.

Figures 11, 12:
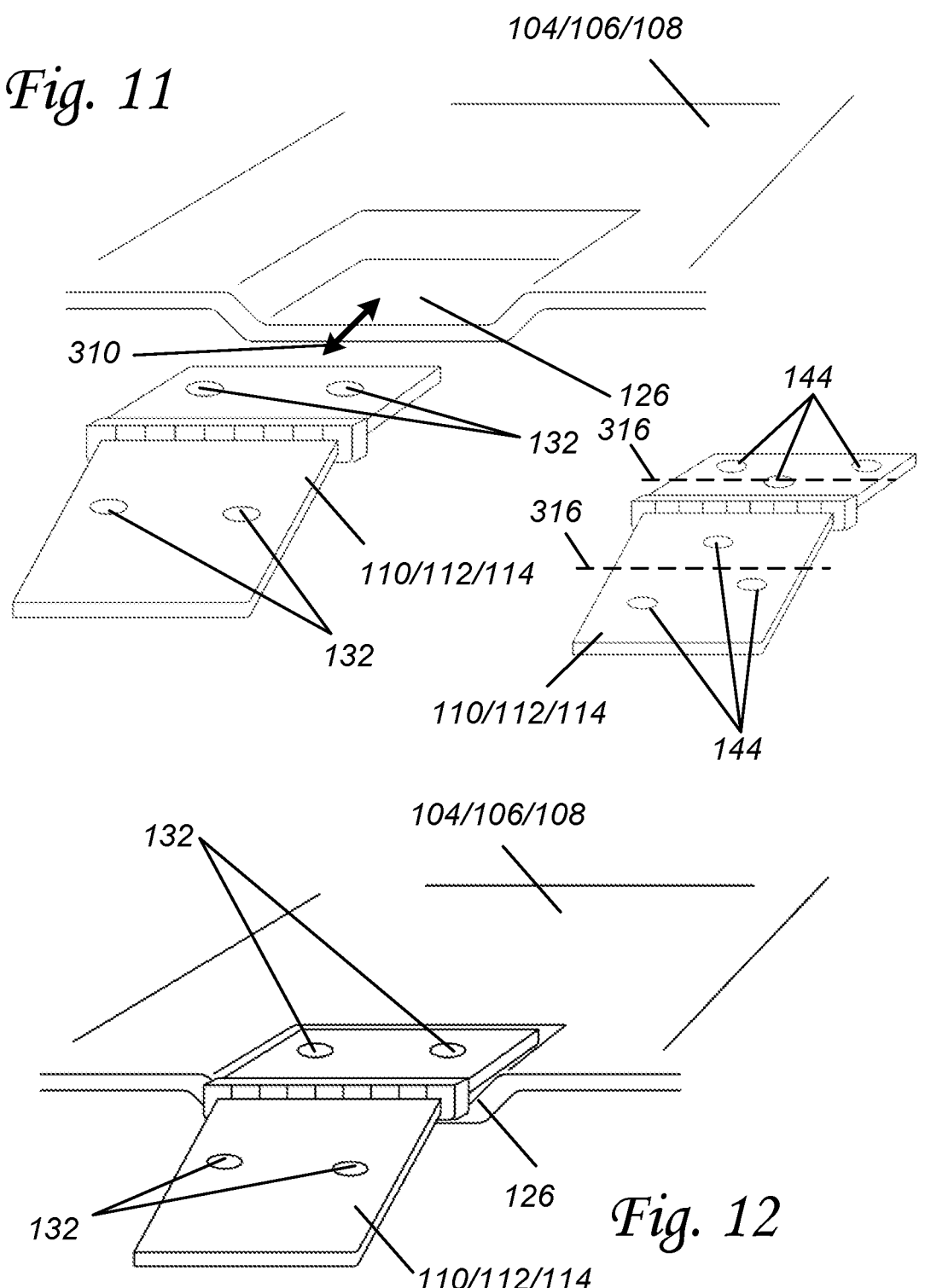
FIGS. 11-12 illustrate one example of a hinge.

Referring to FIGS. 11 and 12, there is illustrated one example of a hinge 110/112/114. FIG. 11 illustrates the hinge 110/112/114 being positioned 310 within a hinge recess and a hinge 110/112/114 that comprises hinge magnets. FIG. 12 illustrates the hinge 110/112/114 fitted in the hinge recess 126.

In an exemplary embodiment, the roof panel 108, the back panel 106, or the partition panel 104 can comprise a hinge recess 126 that is proximate to the perimeter edge. In operation, the hinge recess 126 aligns the hinge 110/112/114 within the hinge recess 126 and prevents the hinge 110/112/114 from rotating on the surface of the panel 104/106/108. The hinges can have holes 132 through which a fastener 120 can be fitted to secure the hinge to the panel 104/106/108, or hinge magnets 144 can be pressed, fastened, or otherwise affixed to the hinge 110/112/114.

In embodiment where fastener 132 is used with hinge 110/112/114, each of the hinges 110/112/114 can be removably fastened to the back panel 106, the partition panel 104, or the roof panel 108 with nuts and bolts. In operation, the cooking splash guard 100 can be assembled for use and disassembled for storage.

In an exemplary embodiment, more than one hinge magnet 144 can be fastened to the hinge 110/112/114. The hinge 110/112/114 magnetically attaches between and secures together the back panel 106 with the partition panel 104 or the roof panel 108. Each of the hinge magnet 144 is non-collinearly positioned on hinge 110/112/114 with respect to reference line 316.

7

Figure 13:
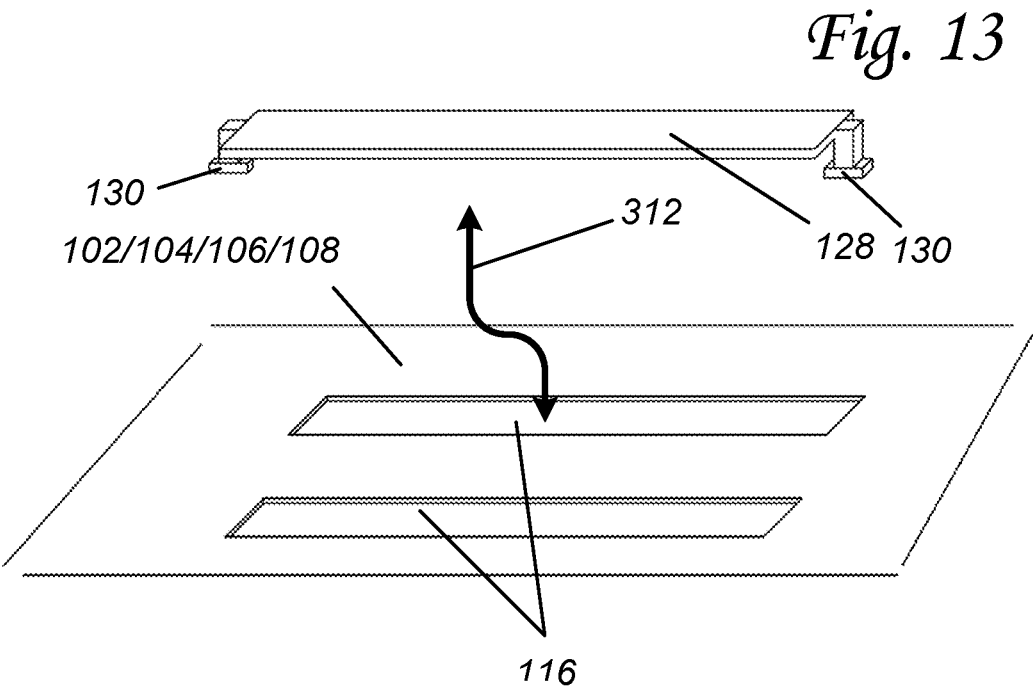
FIGS. 13-14 illustrate one example of a louver.
Figure 14:
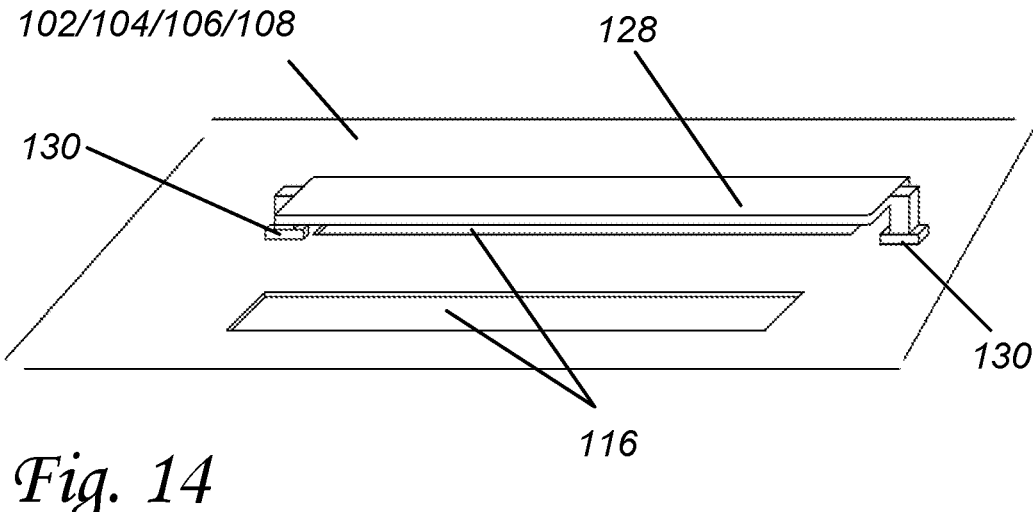

Referring to FIGS. 13 and 14, there is illustrated, one example of a louver 128. FIG. 13 illustrates louver 128 can be positioned 312 over one or more of vent slot 116. FIG. 14 illustrates louver 128 magnetically coupled over one or more vent slots 116. In operation, at least one louver 128 can be secured over any of the vent slots 116. Louver 128 is repositionable to an open position allowing airflow through the vent or a closed position that blocks airflow through the vent slot 116.

In an exemplary embodiment, the cooking splash guard 100 can comprise at least one louver 128, and at least one louver magnet fastener 130. Louver 128 can comprise the louver magnet fastener 130. As such, louver magnet fastener 130 can be affixed at each end of louver 128.

In operation, the louver 128 magnetically couples, by way of the louver magnet fastener 130, onto the back panel 106, the roof panel 108, the partition panel 104, or the side panel 102, extending over at least one vent slot 116. The louver 120 can be repositioned to an open position allowing airflow through the vent slot 116, or a closed position blocking airflow through the vent slot 116. In the closed position, airflow through vent slot 116 is abated while in the open position, airflow through vent slot 116 is unabated.

The louver 128 can be positioned in any orientation and on either side of panels 102/104/106/108.

For storage, the louver 128 can be relocated to a solid portion on panels 102/104/106/108 out of the way and magnetically coupled in place.

Figure 15:
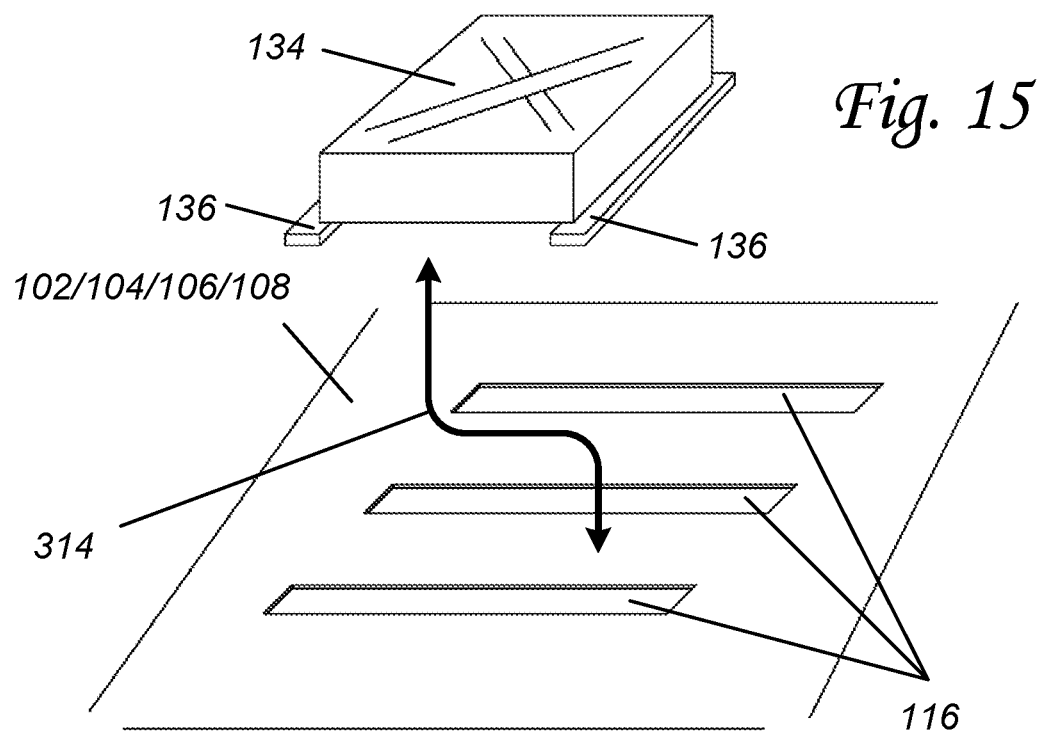
FIGS. 15-16 illustrate one example of a fan.
Figure 16:
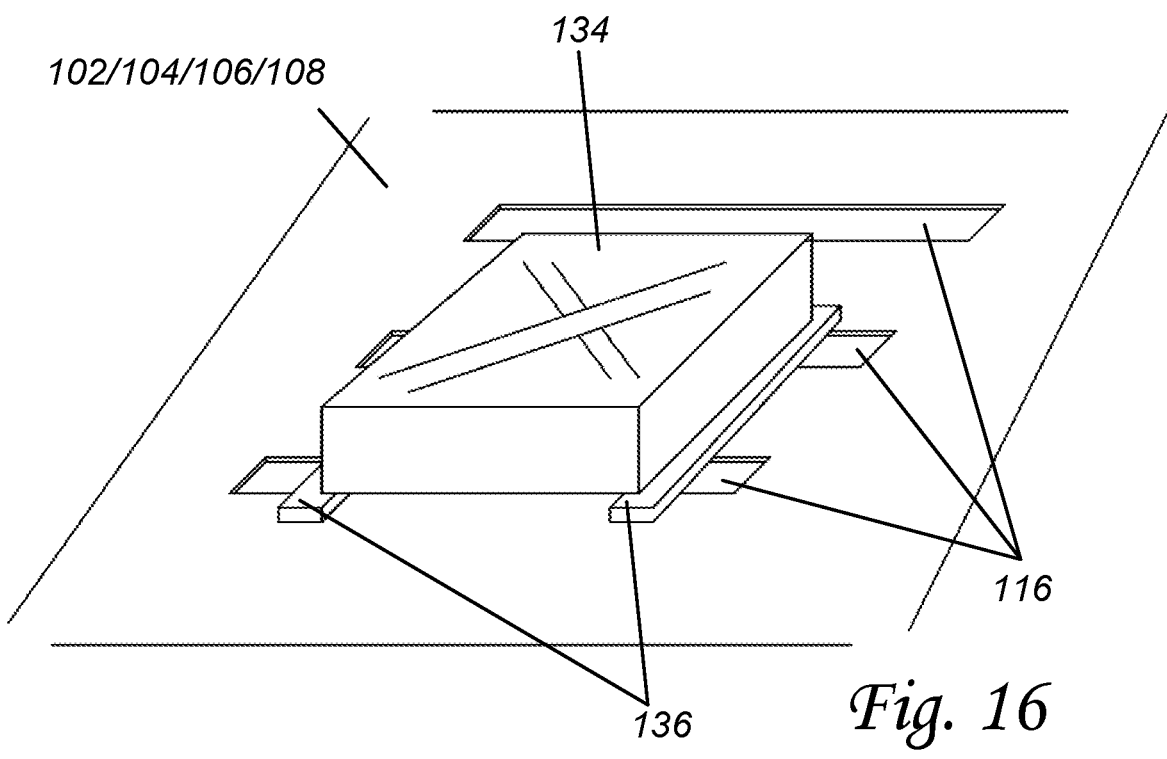

Referring to FIGS. 15 and 16, there is illustrated one example of a fan 134. FIG. 15 illustrates fan 134 can be positioned 314 over one or more of vent slot 116. FIG. 16 illustrates fan 134 magnetically coupled over one or more vent slots 116. In operation, at least one of a fan 134 can be secured over any of the vent slots 116.

In an exemplary embodiment, the cooking splash guard 100 can comprise one or more fans 134, and at least one fan magnet fastener 136. The fan 134 can comprise the fan magnet fastener 136. As such fan magnet fastener 136 can be affixed to each side of fan 134.

In operation, the fan 134 magnetically couples, in a removable manner, over at least a portion of vent slot 116 on the back panel 106, the roof panel 108, the partition panels 104, or the side panels 102.

The fan 134 can be positioned in any orientation and on either side of panels 102/104/106/108. In operation, fan 134 directs airflow through the vent slots and across the cooktop surface 204 area.

For storage, fan 134 can be relocated to a solid portion on panels 102/104/106/108 out of the way and magnetically coupled in place.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A cooking splash guard comprising:
more than one of a hinge;
a back panel;
more than one of a partition panel, at least one of the hinge attaches between each of the partition panel and the back panel allowing the partition panel to be repositioned along a partition panel arc, engendering the cooking splash guard to stand vertically on a cooktop surface;

more than one of a panel magnet fastener is affixed along perimeter of the partition panel; and
more than one of a side panel, edge of each of the side panel are magnetically coupled to the panel magnet fastener, in a removable manner, each of the side panel is repositionable along a side panel arc.

2. The cooking splash guard in accordance with claim 1, further comprising:
a roof panel; and
a tether traverses portion of exterior surface of the roof panel and the back panel, the tether fastens at one end to the roof panel and at other end to the back panel supporting the roof panel in a mostly perpendicular position with respect to the back panel.

3. The cooking splash guard in accordance with claim 2, the tether comprises more than one of an adjustment link, the adjustment link sets the tether length which allows angle of the the roof panel to be adjusted with respect to the back panel.

4. The cooking splash guard in accordance with claim 1, further comprising:
a roof panel, at least one of the hinge attaches one end to the roof panel to the back panel, the hinge adjustably supporting the roof panel in a mostly perpendicular position with respect to the back panel.

5. The cooking splash guard in accordance with claim 1, each of the side panel is slidably adjustable vertically to accommodate different height objects on the cooktop surface.

6. The cooking splash guard in accordance with claim 1, at least one of the roof panel, the back panel, or the partition panel comprises a hinge recess proximate to the perimeter edge, wherein the hinge recess aligns 310 the hinge and prevents the hinge from rotating.

7. The cooking splash guard in accordance with claim 1, at least one of following having at least one of a vent slot: the back panel, the roof panel, the partition panel, or the side panel.

8. The cooking splash guard in accordance with claim 7, further comprising:
at least one of a louver is secured over the vent slot, the louver is repositionable to open position allowing airflow through the vent slot or closed position blocking airflow through the the vent slot.

9. The cooking splash guard in accordance with claim 7, further comprising:
at least one of a louver; and
at least one of the louver magnet fastener, the louver comprises the louver magnet fastener, the louver magnetically couples, by way of the louver magnet fastener, onto at least one of the back panel, the roof panel, the partition panel, or the side panel, extending over at least one of the vent slot, the louver is repositionable to open position allowing airflow through the vent slot or closed position blocking airflow through the vent slot.

10. The cooking splash guard in accordance with claim 7, further comprising:
at least one of a fan; and
at least one of a fan magnet fastener, the fan comprises the fan magnet fastener, the fan magnetically couples, in a removable manner, over at least portion of the vent slot on at least one of the following: the back panel, the roof panel, the partition panel, or the side panel.

11. The cooking splash guard in accordance with claim 1, each of the hinge is removably fastened to the back panel, the partition panel, or the roof panel with nuts and bolts, wherein the cooking splash guard can be assembled for use and disassembled for storage.

12. The cooking splash guard in accordance with claim 1, further comprising:

more than one of a hinge magnet is fastened to the hinge, the hinge magnetically attaches between and secures together the back panel with the partition panel or the roof panel, each of the hinge magnet is non-collinearly positioned on the hinge with respect to a reference line.

13. The cooking splash guard in accordance with claim 1, for storage, the roof panel is sized and configured to fold flat onto front side of the back panel, each of the partition panel is sized and configured to fold flat on front side of the back panel, and each of the side panel is removable from the panel magnet fastener.

14. A cooking splash guard comprising:
more than one of a vent slot;
more than one of a hinge;
a back panel having at least one of the vent slot;
more than one of a partition panel having at least one of the vent slot, at least one of the hinge attaches between each of the partition panel and the back panel allowing the partition panel to be repositioned along a partition panel arc, engendering the cooking splash guard to stand vertically on a cooktop surface;
more than one of a panel magnet fastener is affixed along perimeter of the partition panel;
more than one of a side panel having at least one of the vent slot, edge of each of the side panel are magnetically coupled to the panel magnet fastener, in a removable manner, each of the side panel is repositionable along a side panel arc;
a roof panel having at least one of the vent slot, at least one of the hinge is attached between the roof panel and the back panel; and
a tether traverses portion of exterior surface of the roof panel and the back panel, the tether fastens at one end to the roof panel and at other end to the back panel supporting the roof panel in a mostly perpendicular position with respect to the back panel.

15. The cooking splash guard in accordance with claim 14, the tether comprises more than one of an adjustment link, the adjustment link sets the tether length which allows angle of the the roof panel to be adjusted with respect to the back panel.

16. The cooking splash guard in accordance with claim 14, further comprising:

at least one of a louver; and
at least one of the louver magnet fastener, the louver comprises the louver magnet fastener, the louver magnetically couples on at least one of the back panel, the roof panel, the partition panel, or the side panel, extending over at least one of the vent slot, the louver is repositionable to open or block the vent slot.

17. The cooking splash guard in accordance with claim 14, further comprising:

at least one of a fan; and
at least one of a fan magnet fastener, the fan comprises the fan magnet fastener, the fan magnetically couples, in a removable manner, over at least portion of the vent slot on at least one of the following: the back panel, the roof panel, the partition panel, or the side panel.

18. A cooking splash guard comprising:
more than one of a vent slot;
more than one of a hinge;
a back panel having at least one of the vent slot;
more than one of a partition panel having at least one of the vent slot, at least one of the hinge attaches between each of the partition panel and the back panel allowing the partition panel to be repositioned along a partition panel arc, engendering the cooking splash guard to stand vertically on a cooktop surface;
more than one of a panel magnet fastener is affixed along perimeter of the partition panel;
more than one of a side panel having at least one of the vent slot, edge of each of the side panel are magnetically coupled to the panel magnet fastener, in a removable manner, each of the side panel is repositionable along a side panel arc and slidably adjustable vertically to accommodate different height objects on the cooktop surface;
a roof panel having at least one of the vent slot, at least one of the hinge is attached between the roof panel and the back panel;
a tether traverses portion of exterior surface of the roof panel and the back panel, the tether fastens at one end to the roof panel and at other end to the back panel; and
an adjustment link, the tether comprises the adjustment link, the adjustment link sets the tether length which allows angle of the the roof panel to be adjusted with respect to the back panel.

19. The cooking splash guard in accordance with claim 18, further comprising:

at least one of a louver; and
at least one of the louver magnet fastener, the louver comprises the louver magnet fastener, the louver magnetically couples on at least one of the back panel, the roof panel, the partition panel, or the side panel, extending over at least one of the vent slot, the louver is repositionable to open or block the vent slot.

20. The cooking splash guard in accordance with claim 19, further comprising:

at least one of a fan; and
at least one of a fan magnet fastener, the fan comprises the fan magnet fastener, the fan magnetically couples, in a removable manner, over at least portion of the vent slot on at least one of the following: the back panel, the roof panel, the partition panel, or the side panel.

\* \* \* \* \*